Jan. 22, 1957     I. JEPSON     2,778,921
WARMING DEVICE FOR HEATING VARIABLE QUANTITIES OF MATERIAL
OF DIFFERENT INITIAL TEMPERATURES TO
THE SAME FINAL TEMPERATURE
Filed March 24, 1952     2 Sheets-Sheet 2
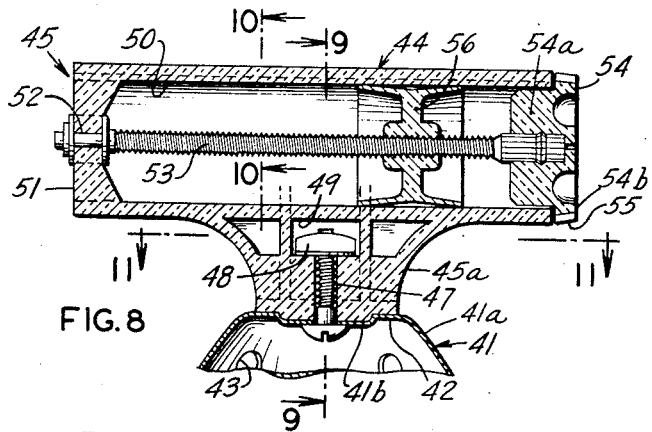
FIG. 8
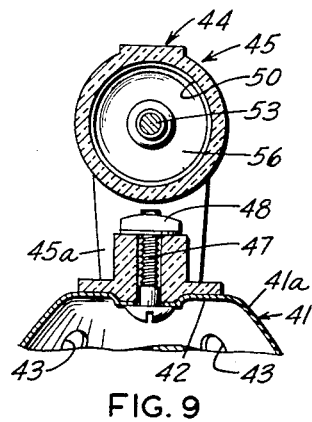
FIG. 9
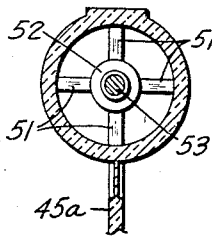
FIG. 10
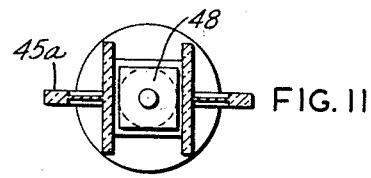
FIG. 11
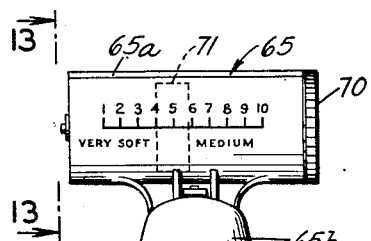
FIG. 12
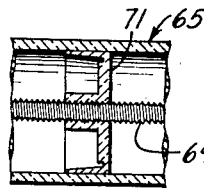
FIG. 14
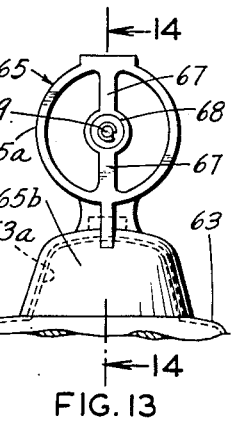
FIG. 13
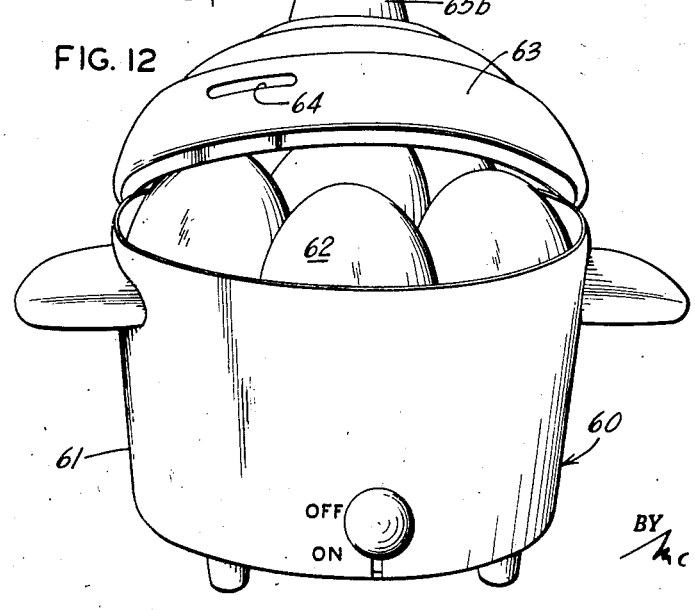
INVENTOR.
IVAR JEPSON
BY
McKenna & Morelock
ATTORNEYS United States Patent Office 2,778,921
Patented Jan. 22, 1957

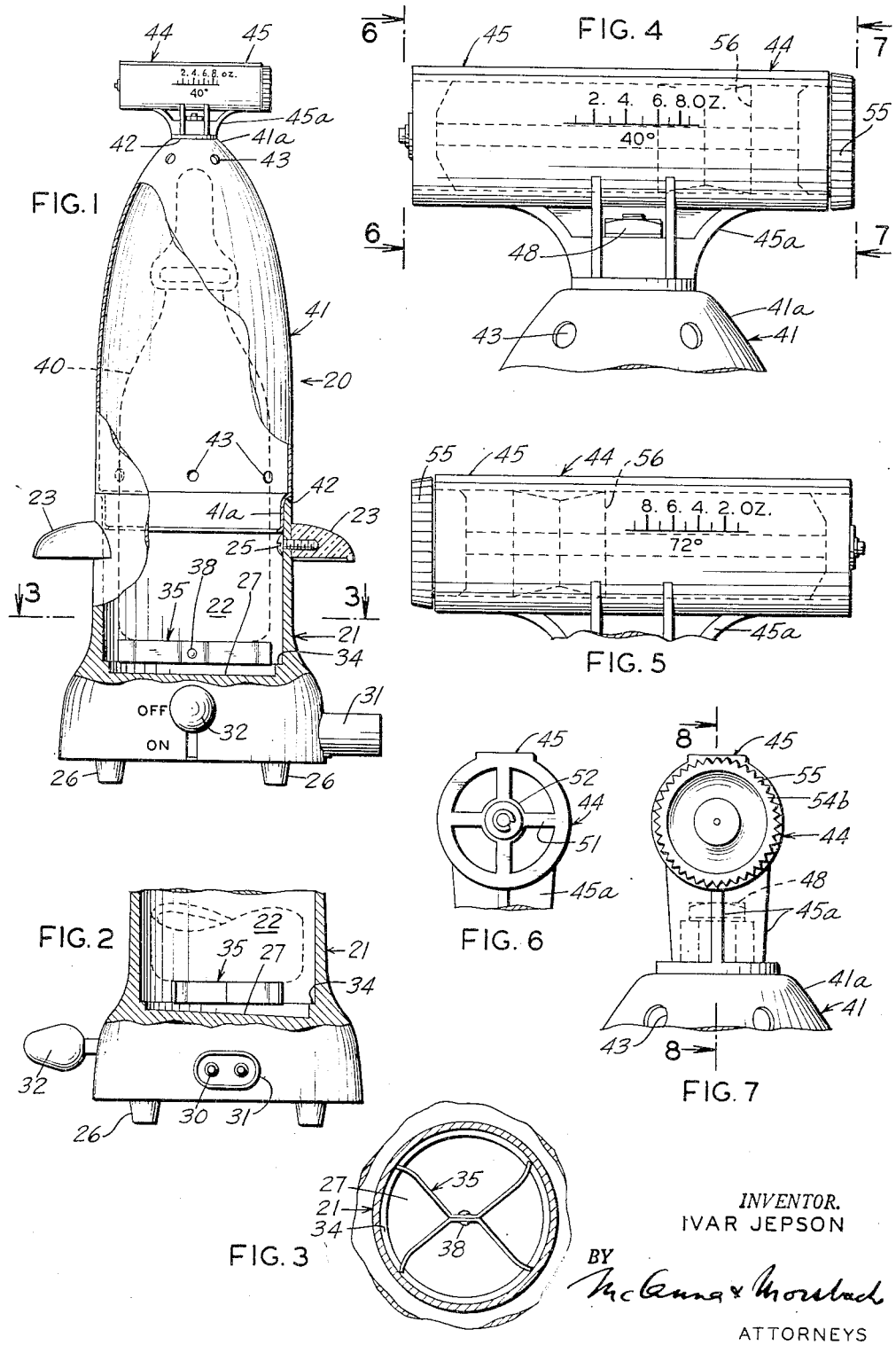

2,778,921

WARMING DEVICE FOR HEATING VARIABLE QUANTITIES OF MATERIAL OF DIFFERENT INITIAL TEMPERATURES TO THE SAME FINAL TEMPERATURE

Ivar Jepson, Oak Park, Ill., assignor to Sunbeam Corporation, Chicago, Ill., a corporation of Illinois Application March 24, 1952, Serial No. 278,157

4 Claims. (Cl. 219—44)

This invention relates to warming or heating devices and more particularly electrical warming or heating devices for warming or heating variable quantities of material which may have different initial temperatures to the same final temperature in every case. Specifically, the present invention is particularly adapted for use in connection with a baby bottle warmer wherein variable quantities of milk, orange juice, water, or the like, are to be heated to slightly above body temperature regardless of the initial temperature.

There have been available on the market heating devices variously termed baby bottle warmers which have taken many forms. Many such devices are electrical and one type extensively sold on the market relies upon the conductivity of water to complete an electrical circuit, and when the water is all evaporated the circuit is interrupted and the heating terminated. Unfortunately, such devices require continual attention on the part of the operator to determine when the desired heating has been obtained and it is found that the baby bottle is either heated too much or too little. As the result of the unsatisfactory operation of such prior art devices, a more common way of heating the infant's bottle has comprised placing the same in a pan of water over a heating device such as an electric or gas range. This again requires the constant attention of someone to see that the right temperature is obtained. It would be desirable to provide a warming or heating device which would automatically heat an infant's bottle and the contents thereof to the proper temperature, namely, slightly above body temperature and when this temperature is obtained, terminate the heating. It is well recognized that depending upon the size and age of the particular infants under consideration, the quantity of food varies widely. The standard infant's bottle usually comprises an eight ounce bottle with graduations in ounces to permit any variable lesser quantity to be contained therein. Obviously, the parent or other person taking care of the infant desires to heat only the quantity which the infant is to receive and, therefore, any baby or infant bottle warmer must automatically control the heating to body temperature regardless of the quantity which is to be heated. Thus, if one starts with two ounces or eight ounces of fluid to be heated, the baby bottle warmer should automatically terminate heating operation when body temperature is obtained regardless of the quantity, even though it will be obvious that a longer heating time is necessary for heating a larger quantity of material to the same final or ultimate temperature.

It will be understood that milk or a formula including milk or milk substitutes are perishable items and are normally refrigerated. This means that under normal conditions, the bottle containing the material to be heated is taken out of the refrigerator and may have an initial temperature somewhat of the order of 40° F. However, on occasion the temperature may initially be room temperature which would often be true in the case of water which would not require refrigeration. The same might be true of orange juice or other foods prepared immediately before using. Consequently, a baby bottle warmer for satisfactory operation must not only be able to heat variable quantities of material to the same ultimate temperature automatically, but must be capable of doing this even though the initial temperatures are quite different under varied conditions.

Moreover, baby bottle warmers heretofore available have heated the lower portion of the bottle only so that the upper portion is actually still cold when the bottom of the bottle is too hot to touch. It would be desirable to provide a baby bottle warmer in which a steam jacket completely encloses the entire bottle and nipple so as to obtain a uniform temperature of the entire bottle and contents and sterilization of the nipple. Such an arrangement should include a suitable bottle support which will reduce heat transfer by conduction to a minimum so as to eliminate the likelihood of cracking of the bottles whether made of temperature proof glass or not.

Accordingly, it is an object of the present invention to provide a new and improved heating device capable of heating variable quantities of material which may have different initial temperatures to the same ultimate temperature in every case.

It is another object of the present invention to provide a new and improved infant bottle warmer for electrically heating an infant's bottle and the contents thereof automatically to the same ultimate temperature regardless of the initial temperature and regardless of the quantity to be heated.

It is another object of the present invention to provide an improved baby bottle warmer in which the heating interval is varied by placing various quantities of water in a receptacle to be evaporated therefrom, together with improved means for determining such varied quantities.

It is a further object of the present invention to provide an improved heating device having a combined handle and measuring unit.

Still another object of the present invention resides in an improved baby bottle warmer of simple and compact construction yet sturdy construction requiring a minimum of manufacturing expense and providing years of foolproof operation.

It is a further object of the present invention to provide an improved baby bottle warmer in which the entire bottle and nipple is enclosed in a steam jacket for uniform heating and sterilization of the nipple.

Yet another object of the present invention is the provision of an improved support for bottles within the bottle warmer to eliminate breakage.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings in which Fig. 1 is an elevational view partly in section of a heating device specifically illustrated as a baby bottle warmer embodying the present invention;

Fig. 2 is a view similar to Fig. 1 of the lower portion thereof taken from the righthand side of Fig. 1;

Fig. 3 is a sectional view taken on line 3—3 of Fig. 1 assuming that Fig. 1 shows the complete structure;

Fig. 4 is an enlarged view of the upper portion of the device shown in Fig. 1;

Fig. 5 is a view similar to Fig. 4 but viewed from the opposite side thereof;

Fig. 6 is a view looking in the direction of the arrows 6—6 of Fig. 4;

Fig. 7 is a view looking in the direction of the arrows 7—7 of Fig. 4;

Fig. 8 is a sectional view taken on line 8—8 of Fig. 7;

Fig. 9 is a sectional view taken on line 9—9 of Fig. 8 assuming that Fig. 8 shows the complete structure;

Fig. 10 is a sectional view taken on line 10—10 of Fig. 8 again assuming that Fig. 8 shows the complete structure;

Fig. 11 is a sectional view taken on line 11—11 of Fig. 8 again assuming that Fig. 8 shows the complete structure;

Fig. 12 is a somewhat perspective view of another heating device for a purpose different from that shown in Fig. 1 illustrating another application of the present invention;

Fig. 13 is a view looking in the direction of the arrows 13—13 of Fig. 12; and

Fig. 14 is a fragmentary sectional view taken on line 14—14 of Fig. 13.

The heating or warming device of the present invention essentially comprises a heating chamber having an inclined bottom within which is placed a measured quantity of water, which is evaporated upon heating thereof, and upon evaporation permits the bottom of the heating chamber to rise rapidly in temperature to control a suitable thermostatic device. The material to be heated is also placed in the heating chamber and the length of the heating interval is controlled by the quantity of water placed in the chamber which must be evaporated before terminating the heating operation. An improved measuring unit forming a part of the handle assembly of the heating device is employed to give complete and accurate control of the heating interval to insure that the same ultimate temperature is reached automatically regardless of the initial temperature and regardless of the quantity to be heated to such ultimate temperature.

Referring now to the drawings, there is illustrated by way of specific example in Fig. 1 a baby bottle warmer generally designated as 20. It should be understood that the application of the heating device to heating an infant's bottle is an example of a heating device in which variable quantities of material are required to be heated to the same ultimate temperature. As illustrated the baby bottle warmer 20 comprises a body member 21 whose upper portion defines a cylindrical heating chamber 22 and whose lower portion uses suitable electric heating means and control means forming no part of the present invention. Actually, the heating and control means not shown in the drawings are preferably identical with those disclosed and claimed in co-pending Jepson application, Serial No. 155,977, filed April 14, 1950 (C–9579). Preferably the body 21 may be an aluminum die casting provided adjacent its upper end with a pair of handles 23 formed of a suitable insulating material such as a phenolic resin. These handles are attached to the body at diametrically opposed positions by suitable fastening means 25. Preferably also the body 21 is supported on suitable legs of insulating material 26 which may be attached to the bottom by suitable screws not shown. Preferably the chamber 22 is defined by a bottom wall 27 which is inclined as best shown in Fig. 2. As is fully disclosed in the above mentioned co-pending application there is preferably attached to the underside of the wall 27 a suitable electrical heating element, the heating of which is controlled by a thermostatically controlled switch. Moreover, the thermostat for controlling this switch is disposed so as to be responsive to the temperature of the bottom wall 27 adjacent its deeper portion as determined by the incline thereof as shown in Fig. 2. It will readily be apparent that as long as any water remains on the bottom, the temperature of the bottom adjacent the water cannot vary in temperature substantially from the boiling temperature of water, but as soon as the water is removed the temperature may rise rapidly and it is this principle which is employed in applicant's co-pending application, and also in the heating device of the present invention to terminate the heating operation. In Figs. 1 and 2 of the drawings there are illustrated the conventional pin connectors 30 enclosed within a plug guard 31 for accommodating the conventional electrical connector used with appliances in general. Also there is illustrated the manual control knob 32 which is moved to the "on" position to initiate a heating operation and which is automatically moved to the "off" position when the desired ultimate temperature is obtained. The means for moving the device to the "off" position as has been mentioned above is preferably identical with that disclosed in the above mentioned co-pending application. Preferably, also, a suitable signal device such as is disclosed in the above mentioned co-pending application is included so that the operator is given an audible or, if desired, a visual signal indicating that the heating operation has terminated.

For the purpose of supporting a container or similar device containing material to be heated, the chamber 22 preferably has defined around the bottom 27 thereof an annular ledge 34 for receiving suitable supporting means 35 which may have any configuration which will permit the steam produced by evaporation of the liquid inserted in the chamber 22 to envelop the material to be heated. As illustrated the support 35 preferably comprises a sort of supporting spider formed of a pair of deformed metal strips suitably held together by a rivet 38 engaging the center portions thereof, each of the elements being of somewhat V shape configuration with the apices of the V's joined and the legs of the V's resting on the ledge 34. Thus, the support 35 will readily accommodate a container such as a baby bottle designated by the reference numeral 40 and support the same out of direct contact with the bottom 27 of the heating chamber and yet in close proximity thereto. In accordance with the present invention the supporting spider is preferably formed of a metal of relatively poor heat conductivity such as stainless steel and having very narrow edges engaging with both the bottle and the ledge 34 to reduce the heat transfer by conduction to a minimum. With this arrangement cracking of the bottles is substantially eliminated whereas with other arrangements cracking of the bottles is a major problem.

In order to enclose the heating chamber for receiving the baby bottle 40, there is provided a suitable cover 41 in the form of an elongated parabolic member having at its lower open end a portion of reduced cross section 41a so as to define a shoulder 42 for resting on the upper annular rim of the body 21. The cover 41 is preferably also formed of aluminum and is provided with a plurality of openings 43 adjacent the top and bottom thereof for permitting steam to escape therefrom during the heating operation. The cover 41 is effectively dome-shaped so as to entirely enclose the bottle 40 and the nipple attached thereto as clearly shown in Fig. 1 of the drawings. In accordance with the present invention there is effectively provided a steam jacket completely enclosing the entire bottle 40 as well as the associated nipple. This steam jacket with the vent openings 43 both adjacent the top and bottom thereof insures that the entire bottle and nipple are completely enclosed in steam thereby not only sterilizing the nipple but providing uniform heating of the entire bottle and contents.

In accordance with the present invention, there is provided a combined cover handle and measuring device forming an important feature of the present invention and generally designated by the reference numeral 44. As illustrated the combined handle and measuring device 44 comprises a knob element 45 preferably formed of a suitable plastic or molded material. In a particular embodiment of the present invention the combined handle assembly and measuring device 44 was molded of Lucite which is a transparent material and provides a rather pleasing appearance when combined with an aluminum or somewhat polished appearing article. It will be obvious, however, that any other plastic may be employed although the transparent characteristic thereof has some advantages as will become apparent from the following description. The knob portion 45 is of somewhat T shaped configuration including a portion 45a extending into engagement with the more or less apex of the parabolic shaped cover 41. As best shown in Fig. 8 the cover 41 is provided at this end with a depressed portion 41b and the knob 45 and its portion 45a is provided with a similar extension fitting into the recess defined by the depressed portion 41b. Moreover, the knob 45 is attached to the cover 41 by suitable fastening means such as a screw 47 which has nut 48 disposed in a recess of rectangular shape designated by the reference numeral 49 in the knob 45. This facilitates assembly operation since the nut is prevented from turning. Moreover, the indentation or recess 41b defined in the cover 41 and the cooperating extension of the portion 45a of the knob 45 prevents relative movement between the knob 45 and the cover 41 about the axis of the fastening means 47. Thus, the fastening means 47 assures firm attachment of the knob to the cover. By having the T shaped configuration, the knob may readily be grasped and since it is of an insulated plastic, it can be handled even though the cover 41 may be very hot and too difficult to handle.

In accordance with the present invention, the main portion of the knob 45 is hollow and effectively defines therein a cylindrical chamber 50. One end of the cylindrical chamber 50 is provided with integral cross members 51 connected at the center to define a hub 52 for receiving in rotatable fashion an adjusting screw 53. The adjusting screw 53 is preferably threaded from end to end and has attached thereto at the end remote from the supports 51 a suitable adjusting knob 54, having a portion of reduced cross section 54a insertable within the chamber 50 and a portion of enlarged cross section 54b disposed outside the chamber 50 and provided with a knurled surface 55 best shown in Figs. 4, 5 and 7 of the drawings to facilitate manipulation of the adjusting knob 54. Disposed within the chamber or cylinder 50 is a movable piston 56 which as is best shown in Fig. 8 is provided with a central hub for threadedly receiving the adjusting screw 53. Rotation of the knob 54 and consequently of the screw 53 will cause the piston 56 to be moved to various positions with respect to the open end of the cylinder 50 or, in other words, the end having the struts 51 associated therewith. The piston 56 may be formed of any suitable material and in a particular embodiment of the present invention was formed of polyethylene, preferably of red color to give a pleasing appearance, but obviously may be of any color and of any suitable material.

From the above description it will be apparent that there has been described a knob or handle 45 for the cover 41 which effectively defines a chamber 50 of variable volume, the volume being determined by the particular position of the piston 56 relative to the end of the knob 45 adjacent the struts 51 which is the open end. In accordance with the present invention the knob 45 is provided with several scales, one being shown in Fig. 4 and the other being shown in Fig. 5 disposed on opposite sides of the knob 45. The scale shown in Fig. 4 is calibrated in ounces and below the scale appears the nomenclature 40 degrees. The scale in Fig. 5 is also calibrated in ounces and below the scale appears the nomenclature 72 degrees.

In accordance with the present invention, the edge of the piston such as front edge thereof is adjusted to the scale indication for the number of ounces of liquid to be heated in the baby bottle. Moreover, the scale utilized for this purpose depends upon whether the baby bottle is taken out of the refrigerator or is roughly at room temperature. In Fig. 4 the scale marked with 40 degrees is the one appropriate when the baby bottle is taken out of the refrigerator since that is the normal temperature that refrigerated articles assume in a household refrigerator. The scale in Fig. 5 is the one to be used where the initial temperature of the material to be heated is at room temperature. Obviously, if room temperature is either higher or lower than 72 degrees, corrections can readily be made and the same is true if the refrigerated temperature is higher or lower than 40 degrees. It will be apparent from an examination of Figs. 4 and 5 that the piston 56 is substantially further removed from the open end of the measuring receptacle when the device is set to heat six ounces and the initial temperature is 40 degrees than for the same quantity of material to be heated when the initial temperature is 72 degrees. With the above described arrangement, foolproof operation is assured. In the event that the heating device is used to heat a baby bottle, it is, of course, desired to have the ultimate temperature slightly above body temperature in every case. Under these conditions, the piston 56 is adjusted to the necessary setting depending upon the initial temperature of the material to be heated and the quantity to be heated. The open end of the measuring receptacle is then placed under a faucet and when filled to the top is poured into the heating chamber 22. The baby bottle to be heated is then inserted into the chamber and placed upon the support 35, whereupon the cover is placed in position as shown in Fig. 1, and the heating operation is initiated by actuation of the manual control knob 32. When body temperature is reached, the heating interval will be terminated automatically and a signal to this effect by suitable signal means is preferably given, whereupon the operator may remove the cover and the bottle of milk or other material which is at the proper temperature for immediate use. Moreover, the same ultimate temperature is reached in every case without any attention on the part of the operator.

It will be apparent that the measuring receptacle of the present invention very accurately measures the heating interval and there are numerous applications where such a measuring receptacle when combined with the handle of the heating device may be very satisfactory. In Figs. 12, 13 and 14 there is illustrated another application of present invention applied to an egg cooker generally designated at 60 and, except for the cover, is preferably identical in every respect with the egg cooker disclosed in the above mentioned co-pending Jepson application. As illustrated this egg cooker comprises a heating receptacle or body portion 61 with suitable means for supporting therein eggs 62 during the cooking operation. A suitable cover 63 having steam escape slots 64 is provided to enclose the cooking chamber during the heating or cooking operation. As in the preceding embodiment, the cover 63 is provided with a combined knob and measuring device 65 having a cylindrical portion 65a with its axis perpendicular to the axis of a portion 65b, also of somewhat cup-shaped configuration to receive therein a portion 63a of the cover 63. The cylindrical portion 65a is preferably substantially identical with that described above, although its volume may vary considerably if longer cooking intervals are desired. As illustrated, it comprises integral struts 67 at one end thereof supporting a central hub 68 for rotatably mounting the adjusting screw 69 which at the other end thereof is connected to an adjustable knob 70. Mounted on the adjusting screw 69 is a piston 71, thereby providing a variable measuring chamber. As is best shown in Fig. 12, a suitable scale is provided which may be calibrated in minutes or some other similar scale and which preferably also includes other indicia designating the characteristic of the boiled egg for certain scale settings, such as very soft, medium, and so forth. By virtue of a transparent cylinder, the piston 71 is readily visible therethrough, particularly if formed of a material having a bright color, such as red, so that the scale setting thereof is at once apparent. As in the preceding embodiment, the scale is adjusted for the desired ultimate cooked condition of the eggs and the quantity of water determined thereby is measured out and inserted into the cooking chamber 61. Thereafter the cooking operation is initiated and when the eggs reach the condition for which the setting was made, the cooking operation is terminated. It will be understood that the same desired cooking will result each time by merely using the appropriate measured quantity of water.

The operation of the arrangement described above will be readily apparent in view of the detailed description included and no further discussion thereof is therefore included herein. It will be apparent that there has been provided automatic means for heating variable quantities of material of different initial temperatures to the same ultimate temperature, including a compact, combined handle and measuring assembly, which is foolproof in every way.

While there have been illustrated and described several embodiments of the present invention, it will be understood that numerous changes and modifications will occur to those skilled in the art and it is aimed in the appended claims to cover all such changes and modifications as fall within the true spirit and scope of the present invention.

What is claimed as new and desired to be secured by Letters Patent of the United States is:

1. A cover assembly adapted for use with a heating device of the type in which the heating interval is determined by the quantity of water placed in the device, comprising an elongated cover member having a first axis extending longitudinally and vertically therethrough, an elongated structure defining a cylindrical cavity having a second axis extending longitudinally therethrough and providing a cover handle, means mounting said structure on said cover with said second axis disposed substantially perpendicular to said first axis, said structure defining an opening disposed therein substantially concentric with said second axis at one end of said structure displaced radially from said first axis, a piston mounted within said cylindrical cavity for movement along said second axis relative to said opening to vary the effective volume of said cavity, and means carried on said cover for manually adjusting the position of said piston relative to said cavity.

2. The cover assembly defined by claim 1 including a threaded element rotatably mounted on said structure within said cavity for adjustably supporting said piston and in which the adjusting means includes a knob secured to said threaded element for rotating said element to vary the position of said piston.

3. The cover assembly defined by claim 1 in which the adjusting means comprises a knob mounted on said structure for rotation about said second axis and spaced along said second axis from said opening.

4. A baby bottle warmer for automatically heating a baby bottle and the contents thereof to the same ultimate temperature irrespective of the quantity of material in said bottle, comprising a heating chamber including a dome shaped cover having steam escape passageways, said assembled chamber and cover completely enclosing a baby bottle and associated nipple disposed in said chamber except for the openings provided by said passageways, said dome shaped cover including a substantially straight walled bottom portion located intermediate the length of said bottle and a curved wall top portion located adjacent said nipple, means for supporting such a bottle within said chamber, heating means for converting water placed in said chamber to steam, said steam escape passageways being located in said cover near both said top portion and said bottom portion of said cover whereby a jacket of steam envelops a bottle and nipple disposed within said chamber for uniformly heating said bottle and contents and sterilizing said nipple.

References Cited in the file of this patent

UNITED STATES PATENTS

| | | |
|---|---|---|
| 1,041,417 | Bohlig | Oct. 15, 1912 |
| 1,055,882 | Cubitt | Mar. 11, 1913 |
| 1,683,070 | Hanks | Sept. 4, 1928 |
| 1,860,302 | Thomas | May 24, 1932 |
| 1,913,442 | Hanks | June 13, 1933 |
| 1,977,482 | Klause | Oct. 16, 1934 |
| 2,204,730 | Eskilson | June 18, 1940 |
| 2,505,092 | Brewer | Apr. 25, 1950 |